United States Patent
Gan et al.

(10) Patent No.: US 10,178,708 B1
(45) Date of Patent: Jan. 8, 2019

(54) CHANNEL SUMMARY FOR NEW MEMBER WHEN JOINING A TALKGROUP

(71) Applicant: MOTOROLA SOLUTIONS, INC, Chicago, IL (US)

(72) Inventors: Guo Dong Gan, Kuala Lumpar (MY); Mun Yew Tham, Bayan Lepas (MY); Kong Yong Foo, Bayan Lepas (MY); Bing Qin Lim, Jelutong (MY)

( * ) Notice: Subject to any disclaimer, the term of this patent is extended or adjusted under 35 U.S.C. 154(b) by 0 days.

(21) Appl. No.: 15/642,372

(22) Filed: Jul. 6, 2017

(51) Int. Cl.
| | |
|---|---|
| H04B 7/00 | (2006.01) |
| H04W 76/45 | (2018.01) |
| H04W 4/10 | (2009.01) |
| H04L 12/18 | (2006.01) |
| H04L 29/06 | (2006.01) |
| H04W 84/08 | (2009.01) |
| H04W 4/08 | (2009.01) |

(52) U.S. Cl.
CPC ......... *H04W 76/45* (2018.02); *H04L 12/1822* (2013.01); *H04L 29/06442* (2013.01); *H04W 4/08* (2013.01); *H04W 4/10* (2013.01); *H04W 84/08* (2013.01)

(58) Field of Classification Search
CPC ......... H04W 4/10; H04W 76/45; H04W 4/08; H04W 76/005; H04W 84/08; H04L 12/1822; H04L 29/06442
See application file for complete search history.

(56) References Cited

U.S. PATENT DOCUMENTS

| | | | | |
|---|---|---|---|---|
| 5,542,108 | A * | 7/1996 | Sasuta | H04W 72/044 455/520 |
| 8,095,140 | B2 * | 1/2012 | Tang | H04M 3/42357 370/329 |
| 8,189,583 | B2 * | 5/2012 | LoGalbo | H04W 8/186 370/228 |
| 2009/0137263 | A1 * | 5/2009 | Abbate | H04W 76/45 455/518 |
| 2009/0157709 | A1 | 6/2009 | Kruger et al. | |
| 2009/0326979 | A1 | 12/2009 | Ryan | |
| 2011/0195739 | A1 * | 8/2011 | Deleus | H04W 4/00 455/518 |
| 2011/0237217 | A1 | 9/2011 | Monks et al. | |
| 2011/0319117 | A1 * | 12/2011 | Gonsalves | H04L 12/1822 455/519 |
| 2013/0137476 | A1 * | 5/2013 | Kawaguchi | H04W 4/08 455/519 |

(Continued)

FOREIGN PATENT DOCUMENTS

WO    2014130385 A1    8/2014

OTHER PUBLICATIONS

The International Search Report and the Written Opinion, corresponding serial No. PCT/US2018/040537 filed Jul. 2, 2018, dated Sep. 10, 2018, all pages.

*Primary Examiner* — Dominic E Rego

(57) ABSTRACT

A method and apparatus for providing a summary of what is being and/or has been discussed or experienced by members of a talkgroup is provided herein. Upon a new member joining a talkgroup, or just prior to the new member joining the talkgroup, the new member will be placed on a private channel to provide the new member with knowledge on previous discussions/experiences of talkgroup members. Preferably, the prior knowledge will be conveyed to the user audibly by, for example, use of a digital assistant.

10 Claims, 5 Drawing Sheets

(56) References Cited

U.S. PATENT DOCUMENTS

| | | | |
|---|---|---|---|
| 2013/0156175 A1* | 6/2013 | Bekiares | H04L 12/1822 379/202.01 |
| 2016/0135203 A1* | 5/2016 | Kim | H04W 48/20 370/315 |
| 2017/0099455 A1* | 4/2017 | Mazzarella | H04W 4/90 |

* cited by examiner

CHANNEL SUMMARY FOR NEW MEMBER WHEN JOINING A TALKGROUP

BACKGROUND OF THE INVENTION

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (e.g., without further user input) or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

Modern two-way radio systems feature talkgroup creation where it is possible for a radio to be a member of any combination of talkgroups. As a member of a talkgroup, a radio may receive transmissions from, as well as transmit to all members of the talkgroup. Transmission and reception of information to radios outside of an assigned talkgroup is generally not performed. Illustratively, a radio assigned to an ambulance may be a member of a Fire & Rescue talkgroup as well as a Law Enforcement talkgroup. Therefore, the radio may communicate with all members of the Fire & Rescue talkgroup as well as the Law Enforcement talkgroup.

Oftentimes when a new member joins an existing talkgroup that is actively discussing certain subject matter (e.g. an incident), the new member that is joining the talkgroup will feel disconnected with the on-going discussion due to the lack of prior knowledge of the previous discussion/subject matter. Querying members of the talkgroup about previous discussions will be a waste of time, occupies bandwidth, and interrupts the on-going discussion. Therefore, it would be beneficial if somehow a new member of a talkgroup could be provided with a summary of what is being discussed on a talkgroup prior to joining the talkgroup.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for providing a summary of what is being and/or has been discussed or experienced by members of a talkgroup is provided herein. Upon a new member joining a talkgroup, or just prior to the new member joining the talkgroup, the new member will be placed on a private channel to provide the new member with knowledge on previous discussions/experiences of talkgroup members. Preferably, the prior knowledge will be conveyed to the user audibly by, for example, use of a digital assistant.

The private channel may comprise a channel utilizing a separate frequency, timeslot, or talkgroup ID than the talkgroup the new user wishes to join. In addition, the private channel preferably comprises a channel with a single downlink user (i.e., the new user), however other users may be present on the channel.

The digital assistant will summarize the previous conversations and data collected related to members and context of the talkgroup (such as sensor data, CAD incident data, body worn camera data), and update the new member what has been discussed and/or experienced by the past/current users of the talkgroup for a predetermined period of time prior to the new user joining the talkgroup (e.g. 2 hours prior). Once prior knowledge is established, the new user will be placed to the talkgroup and removed from the private channel. The digital assistant may introduce the new user to existing members of the talkgroup.

Figure 1:
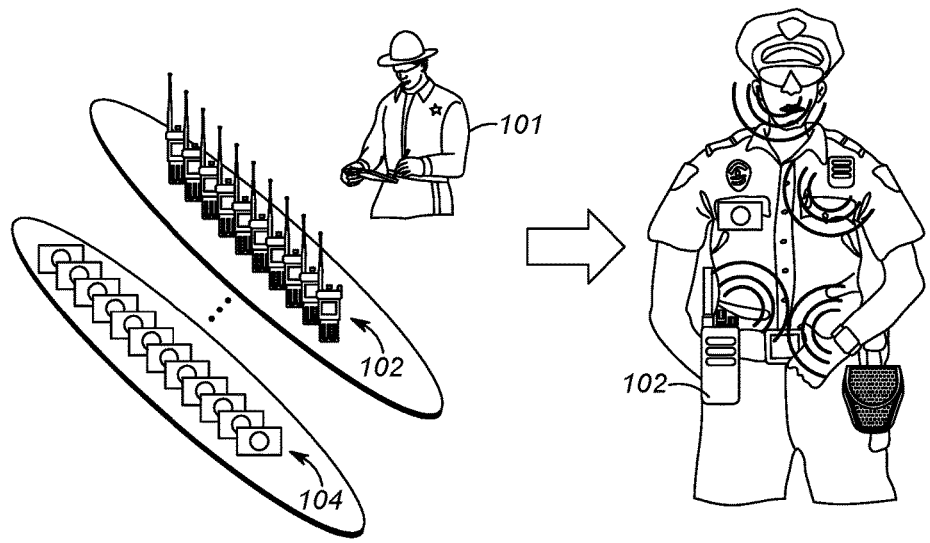
FIG. 1 illustrates an operational environment for the present invention.

Turning now to the drawings, wherein like numerals designate like components, FIG. 1 illustrates an operational environment for the present invention. As shown, a public safety officer 101 will be equipped with devices that determine various physical and environmental conditions surrounding the public-safety officer. These conditions are generally reported back to a dispatch operator so an appropriate action may be taken. For example, future police officers may have a sensor that determines when a gun is drawn. Upon detecting that an officer has drawn their gun, a notification may be sent back to the dispatch operator so that, for example, other officers in the area may be notified of the situation.

It is envisioned that the public-safety officer will have an array of shelved devices available to the officer at the beginning of a shift. The officer will select the devices off the shelf, and form a personal area network (PAN) with the devices that will accompany the officer on his shift. For example, the officer may pull a gun-draw sensor, a body-worn camera, a wireless microphone, a smart watch, a police radio, smart handcuffs, a man-down sensor, . . . , etc. All devices pulled by the officer will be configured to form a PAN by associating (pairing) with each other and communicating wirelessly among the devices. At least one device will be configured with a digital assistant.

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

As shown in FIG. 1, public-safety officer 101 has an array of devices to use during the officer's shift. For example, the officer may pull one radio 102 and one camera 104 for use during their shift. Other devices may be pulled as well. As shown in FIG. 1, officer 101 will preferably wear the devices during a shift by attaching the devices to clothing. These devices will form a PAN throughout the officer's shift.

Figure 2:
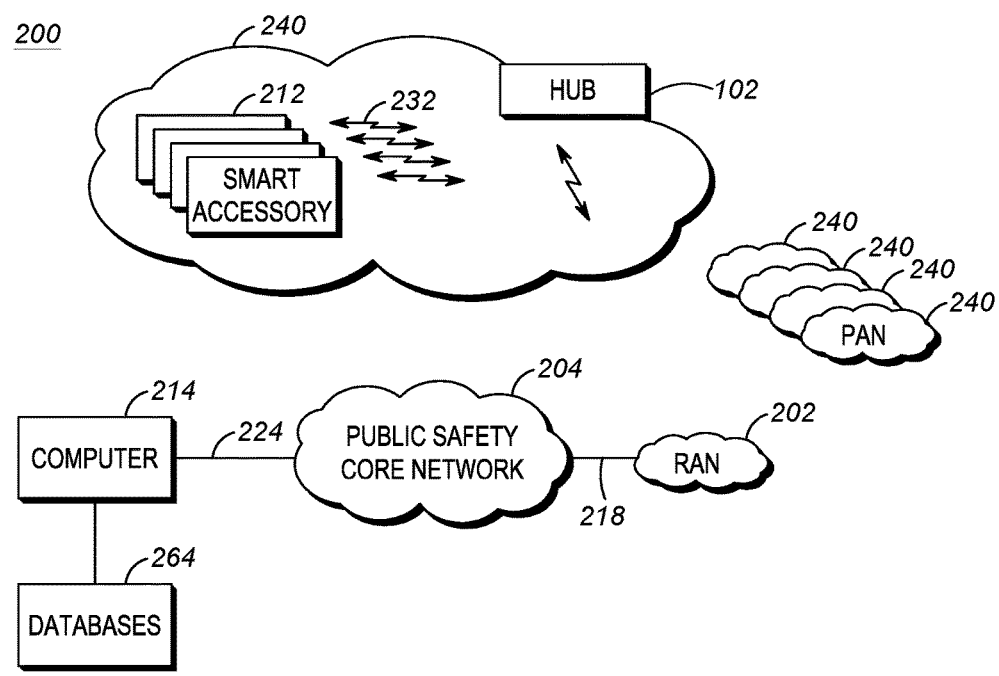
FIG. 2 depicts an example communication system that incorporates a personal-area network and a digital assistant.

FIG. 2 depicts an example communication system 200 that incorporates PANs created as described above. System 200 includes one or more radio access networks (RANs) 202, a public-safety core network 204, hub (PAN master device) 102, local devices (slave devices that serve as smart accessories/sensors) 212, computer 214, and communication links 218, 224, and 232. In a preferred embodiment of the present invention, hub 102 and devices 212 form PAN 240, with communication links 232 between devices 212 and hub 102 taking place utilizing a short-range communication system protocol such as a Bluetooth communication system protocol. Each officer will have an associated PAN 240. Thus, FIG. 2 illustrates multiple PANs 240 associated with multiple officers.

RAN 202 includes typical RAN elements such as base stations, base station controllers (BSCs), routers, switches, and the like, arranged, connected, and programmed to provide wireless service to user equipment (e.g., hub 102, and the like) in a manner known to those of skill in the relevant art. RAN 202 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 202 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 202 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 204 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 204 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Hub 102 serves as a PAN master device, and may be any suitable computing and communication devices configured to engage in wireless communication with the RAN 202 over the air interface as is known to those in the relevant art. Moreover, one or more hub 102 are further configured to engage in wired and/or wireless communication with one or more local device 212 via the communication link 232. Hub 102 will be configured to determine when to forward information via RANs 202 based on a combination of device 212 inputs. In one embodiment, all information received from sensors 212 will be forwarded to computer 214 via RAN 202. In another embodiment, hub 102 will filter the information sent, and only send high-priority information back to computer 214.

It should also be noted that any one or more of the communication links 218, 224, could include one or more wireless-communication links and/or one or more wired-communication links.

Devices 212 and hub 102 may comprise any device capable of forming a PAN. For example, devices 212 may comprise a gun-draw sensor, a body temperature sensor, an accelerometer, a heart-rate sensor, a breathing-rate sensor, a camera, a GPS receiver capable of determining a location of the user device, smart handcuffs, a clock, calendar, environmental sensors (e.g. a thermometer capable of determining an ambient temperature, humidity, presence of dispersed chemicals, radiation detector, etc.), an accelerometer, a biometric sensor (e.g., wristband), a barometer, speech recognition circuitry, a gunshot detector, . . . , etc. Some examples follow:

A sensor-enabled holster 212 may be provided that maintains and/or provides state information regarding a weapon or other item normally disposed within the user's sensor-enabled holster 212. The sensor-enabled holster 212 may detect a change in state (presence to absence) and/or an action (removal) relative to the weapon normally disposed within the sensor-enabled holster 212. The detected change in state and/or action may be reported to the portable radio 102 via its short-range transceiver. In some embodiments, the sensor-enabled holster may also detect whether the first responder's hand is resting on the weapon even if it has not yet been removed from the holster and provide such information to portable radio 102. Other possibilities exist as well.

A biometric sensor 212 (e.g., a biometric wristband) may be provided for tracking an activity of the user or a health status of the user 101, and may include one or more movement sensors (such as an accelerometer, magnetometer, and/or gyroscope) that may periodically or intermittently provide to the portable radio 102 indications of orientation, direction, steps, acceleration, and/or speed, and indications of health such as one or more of a captured heart rate, a captured breathing rate, and a captured body temperature of the user 101, perhaps accompanying other information.

An accelerometer 212 may be provided to measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

A heart rate sensor 212 may be provided and use electrical contacts with the skin to monitor an electrocardiography (EKG) signal of its wearer, or may use infrared light and imaging device to optically detect a pulse rate of its wearer, among other possibilities.

A breathing rate sensor 212 may be provided to monitor breathing rate. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor 212 may be provided, and includes an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Computer 214 comprises, or is part of a computer-aided-dispatch center, manned by an operator providing necessary dispatch operations. For example, computer 214 typically comprises a graphical user interface that provides the dispatch operator necessary information about public-safety officers. As discussed above, much of this information originates from devices 212 providing information to hub 102, which forwards the information to RAN 202 and ultimately to computer 214. Computer 214 comprises a virtual partner (e.g., a microprocessor serving as a virtual partner) that is configured to receive sensor data from sensors 212 and keep track of relevant information. For example, for each user of the system, computer 214 may track the user's current talkgroup along with sensor data for that user. Any voice transmissions may be analyzed as well. This information may be used to compile a summary for each talkgroup. The information is preferably stored in database 264.

With the above in mind, computer 214 is also configured with a natural language processing (NLP) engine configured to determine the intent and/or content of the any over-the-air voice transmissions received by users. The NLP engine may also analyze oral queries and/or statements received by any user and provide responses to the oral queries and/or take other actions in response to the oral statements. It should be noted that any communication between users on the talkgroup will be monitored by the NLP engine in order to determine the content of the over-the-air voice transmission.

Figure 3:
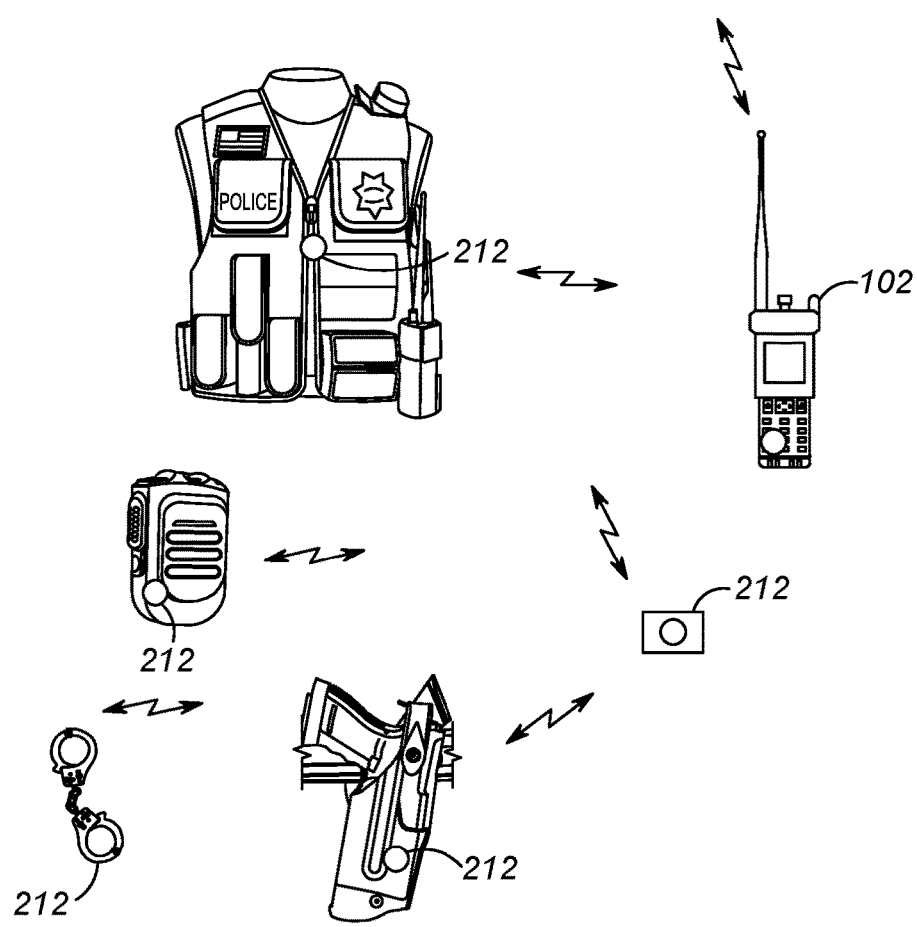
FIG. 3 is a more-detailed view of a personal-area network of FIG. 2.

FIG. 3 depicts another view of a personal-area network 240 of FIG. 2. Personal-area network comprises a very local-area network that has a range of, for example 10 feet. As shown in FIG. 3, various devices 212 are that attach to clothing utilized by a public-safety officer. In this particular example, a bio-sensor is located within a police vest, a voice detector is located within a police microphone, smart handcuffs 212 are usually located within a handcuff pouch (not shown), a gun-draw sensor is located within a holster, and a camera 212 is provided.

Devices 212 and hub 102 form a PAN 240. PAN 240 preferably comprises a Bluetooth PAN. Devices 212 and hub 102 are considered Bluetooth devices in that they operate using a Bluetooth, a short range wireless communications technology at the 2.4 GHz band, commercially available from the "Bluetooth special interest group". Devices 212 and hub 102 are connected via Bluetooth technology in an ad hoc fashion forming a PAN. Hub 102 serves as a master device while devices 212 serve as slave devices.

Hub 102 provides information to the officer, and/or forwards local status alert messages describing each sensor state/trigger event over a wide-area network (e.g., RAN/Core Network) to computer 214. In alternate embodiments of the present invention, hub 102 may forward the local status alerts for each sensor to mobile and non-mobile peers (shift supervisor, peers in the field, etc), or to the public via social media. RAN core network preferably comprises a network that utilizes a public-safety over-the-air protocol.

As discussed above, hub 102 may wish to join a talkgroup to communicate with, or listen to, members of the talkgroup. As described herein, a communication link in a two-way system that communicates voice over a traffic channel to a group of members is referred to as a "talkgroup" or "group". A two-way system features a plurality of talkgroups where it is possible for a radio to be a member of any combination of talkgroups.

Accordingly, hub 102 may scan from a list of control channels to find the active control channel for the system. Hub 102 may listen on the active control channel for a voice channel assignment that corresponds to a designated talkgroup from the plurality of talk groups. The core network is able to distinguish each hub 102 according to an authentication certificate and with a public key assigned to that particular hub 102. In some embodiments, all talkgroups are assigned to the same voice channel. Alternatively, each of the plurality of talkgroups may be assigned to a different voice channel. Also, a subset of the plurality of talkgroups can share a voice channel.

As described above, oftentimes when a new member joins an existing talkgroup that is actively discussing certain subject matter (e.g. Incident), the new member that is joining the talkgroup will feel disconnected on the on-going discussion due to the lack of prior knowledge of the previous discussion/subject matter. Joining an existing talkgroup may be initiated by a command centre dispatcher, self initiated by the new user (e.g. when turning the channel knob to the right channel to join the talkgroup), request a team member help to switch channel, or using voice command to instruct a digital assistant to switch channel to certain talkgroup. Querying members of the talkgroup about previous discussions will be a waste of time, occupies bandwidth, and interrupts the on-going discussion.

Therefore, upon a new member joining a talkgroup, or just prior to the new member joining the talkgroup (e.g. right after a user turns the channel knob), the new member can be placed (e.g., upon request) on a private channel (not used by the talkgroup) to establish prior knowledge about the users currently utilizing the talkgroup.

The scope of the prior knowledge conveyed to the new user may be based on what the new user already knows about the individuals using the channel. For example, the new user's sensor data may be used to determine what the user already knows, and only new information may be provided to the new user. Thus, for example, if the new user already knows the name of the suspect that the talkgroup is discussing, then this information will not be conveyed as part of the summary.

Preferably, the prior knowledge will be conveyed to the user audibly by a digital assistant. The digital assistant may scan through the existing talkgroup members, their conversations, their sensor data, their job functions, their job scopes, their logged timelines, their chat history, their email logs, . . . , etc., and provide a summary to the user on exiting members in the talkgroup.

The digital assistant will summarize the previous conversations and sensor data, and update the new member on what has been discussed and/or experienced by the current users of the talkgroup for a predetermined period of time prior to the new user joining the talkgroup (e.g. 2 hours prior). Alternatively, the predetermined period of time can be determined from the time the new user left the talkgroup if the new user is rejoining the talkgroup. The digital assistant may provide the summary by understanding the content of the prior conversations (via natural-language processing) and any sensor data (video, audio, accelerometer, . . . , etc.).

Any portion of the conversation, video, images, audio content, . . . , etc. that was previously captured by a prior user's sensors of the talkgroup might be shared directly or summarized in natural language to be conveyed by the digital assistant. The digital assistant may also provide a demographic summary (e.g. job function or age or authority level of majority of the team members) of the talkgroup members. During the prior knowledge establishment, the user may ask the digital assistant at anytime for any query related to the prior knowledge, and digital assistant may answer based on the prior knowledge gathered from the talkgroup.

Once prior knowledge is established, the new user will be placed to the talkgroup and the private channel may be dropped. The threshold value on the amount of data to provide the new user on the private channel may be based on the new user's job experience, job function, or job scope, authorization level, background, and/or the user's knowledge of the event in correlation with the discussion point in the talkgroup. For example, if a mechanic is joining the talkgroup, the information provided to the mechanic may be mechanical in nature (for example a police vehicle may have broken down).

As an example of the above, consider a talkgroup that has been established for users that are assigned to a particular incident (e.g., a bank robbery). During the investigation conversations and sensor data may indicate that Officer Dave approached a suspect and a foot chase ensued (as determined by, for example, an accelerometer and Dave's voice communications with the other participants of the talkgroup). The suspect eventually escaped in a blue Ford pickup truck. When a new user joins the talkgroup, the new user may be provided this information. For example, a digital assistant may indicate that "the current talkgroup is being utilized by officers investigating a bank robbery at 123 Main Street at 5:23 AM. Officer Dave gave chase to a suspect, who escaped in a blue Ford pickup truck. Officer Dave discharged his weapon one time. The suspect is a male, in his 20s, brown hair . . . etc. . . . you will now be joined to the talkgroup.". The digital assistant may show on the new user's device (e.g. head mounted display, smartphone, smart watch) any portion of a video clip of Officer Dave chasing the suspect and showing the photo of the suspect. The digital assistant may ask or converse with the new user to see if any further detail are needed by the new user. The new user may initiate the query to digital assistant as well to seek for elaboration (e.g. user may ask "what is the vehicle plate number of the blue Ford?"). Digital assistant will converse or answer new user query based on prior knowledge gathered from the talkgroup.

The digital assistant will evaluate the analysis result of any queries and statements from the new user against the conversational analysis of the talkgroup. The digital assistant will then prompt the user or automatically transfer them to the talkgroup. After the digital assistant has transferred user to the talkgroup, the private channel created for prior knowledge may be kept for a certain amount of duration in which it is determined by digital assistant based on the confidence level, just in case the new user wants to gain more prior knowledge. If the duration exceed a limit, digital assistant will drop the private channel.

Figure 4:
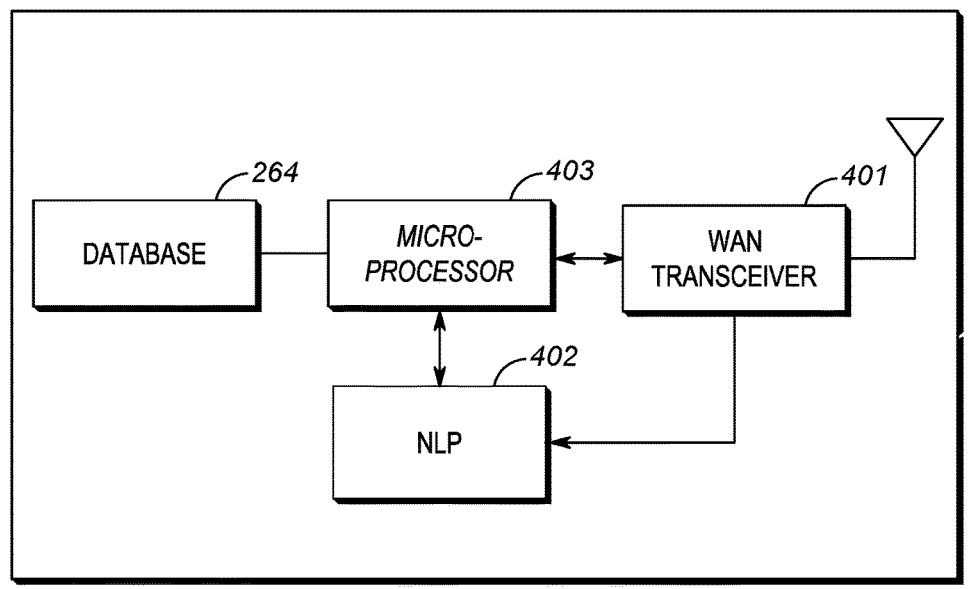
FIG. 4 illustrates a digital assistant providing a history of what was discussed or experienced by users of a talkgroup.

With the above in mind, FIG. 4 sets forth a schematic diagram that illustrates a device 400 for notifying a user of the history of a talk group (i.e., the history of users occupying, or having occupied the talkgroup). In an embodiment, the device is embodied within computer 214, however in alternate embodiments the device may be embodied within the public-safety core network 204, or more computing devices in a cloud compute cluster (not shown), or some other communication device not illustrated in FIG. 2, and/or may be a distributed communication device across two or more entities.

FIG. 4 shows those components (not all necessary) for device 400 to notify a user of a past history for users of a particular talkgroup. For example, for ease of illustration a graphical user interface that provides the dispatch operator necessary information about public-safety officers is not shown since that component is not necessary for understanding the following discussion. As shown, device 400 may include a wide-area-network (WAN) transceiver 401 (e.g., a transceiver that utilizes a public-safety communication-system protocol), Natural Language Processor (NLP) 402, logic circuitry 403 (which may serve as a digital assistant). In other implementations, device 400 may include more, fewer, or different components. Regardless, all components are connected via common data busses as known in the art.

WAN transceiver 401 may comprise well known long-range transceivers that utilize any number of network system protocols. (As one of ordinary skill in the art will recognize, a transceiver comprises both a transmitter and a receiver for transmitting and receiving data). For example, WAN transceiver 401 may be configured to utilize a next-generation cellular communications protocol operated by a cellular service provider, or any public-safety protocol such as an APCO 25 network or the FirstNet broadband network. WAN transceiver 401 receives communications from al members of all talkgroups, as well as sensor data from all users. It should be noted that WAN transceiver 401 is shown as part of device 400, however, WAN transceiver 401 may be located in RAN 202 (e.g., a base station of RAN 202), with a direct link to device 400.

NLP 402 may be a well known circuitry to analyze, understand, and derive meaning from human language in a smart and useful way. By utilizing NLP, automatic summarization, translation, named entity recognition, relationship extraction, sentiment analysis, speech recognition, and topic segmentation can take place.

Logic circuitry 403 comprises a digital signal processor (DSP), general purpose microprocessor, a programmable logic device, or application specific integrated circuit (ASIC) and is configured to compile a summary of events that happened to individuals occupying a particular talkgroup for a predetermined period of time (e.g., for the last 1 hour). Logic circuitry 403 may serve as a digital assistant/virtual partner in order to provide the summary to a user. For example, logic circuitry may provide the user thereof with valuable information in an automated (e.g., without further user input) or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers (i.e., the joining of a talkgroup) in which the electronic digital assistant may proactively provide such valuable information to the user absent any explicit request from the user.

With the above in mind, and as an example, computer 214 may be continuously compiling a history of users of traffic channel ID 4135. Hub 102 may send a request to join traffic channel 4135 by sending a request to RAN 202. RAN 202 notifies computer 214 of the request, and computer 214 may send a notification to hub 102 that a summary is available if desired. If Hub 102 requests a summary, computer 214 will direct RAN 202 to switch hub 102 to a private channel (i.e., a private communication link between the new user's hub 102 and computer 214) and provide the summary to hub 102. Hub 102 may then be joined to the talkgroup 4135.

Database 264 is provided. Database 264 comprises standard memory (such as RAM, ROM, . . . , etc) and serves to store traffic channel identification (e.g., a traffic channel ID) along with a summary of what happened to individuals occupying the traffic channel for a predetermined period of time.

It should be noted that while the above description was given with providing a user of a summary of talkgroup activity, one of ordinary skill in the art will recognize that the same technique may be used to provide a user with a summary of any over-the-air channel, whether or not talkgroups are utilized. With this in mind, FIG. 4 provides for an apparatus comprising a wide-area network (WAN) transceiver communicating with a plurality of users on a particular talkgroup/channel. The WAN transceiver receives a request by a new user to join the particular talkgroup/channel, and the WAN transceiver provides the new user with a talkgroup/channel summary over a private channel. Lastly, the WAN transceiver communicates with the plurality of users and the new user on the particular talkgroup/channel.

A natural language processor is provided for receiving and summarizing voice transmissions from the WAN transceiver. The voice transmissions are from the plurality of users that are part of the particular talkgroup/channel. The talkgroup/channel summary is based on the summarized voice transmissions. Additionally, the WAN transceiver receives sensor data from the plurality of users that are part of the particular talkgroup/channel. The talkgroup/channel summary can additionally be based on the sensor data.

Figure 5:
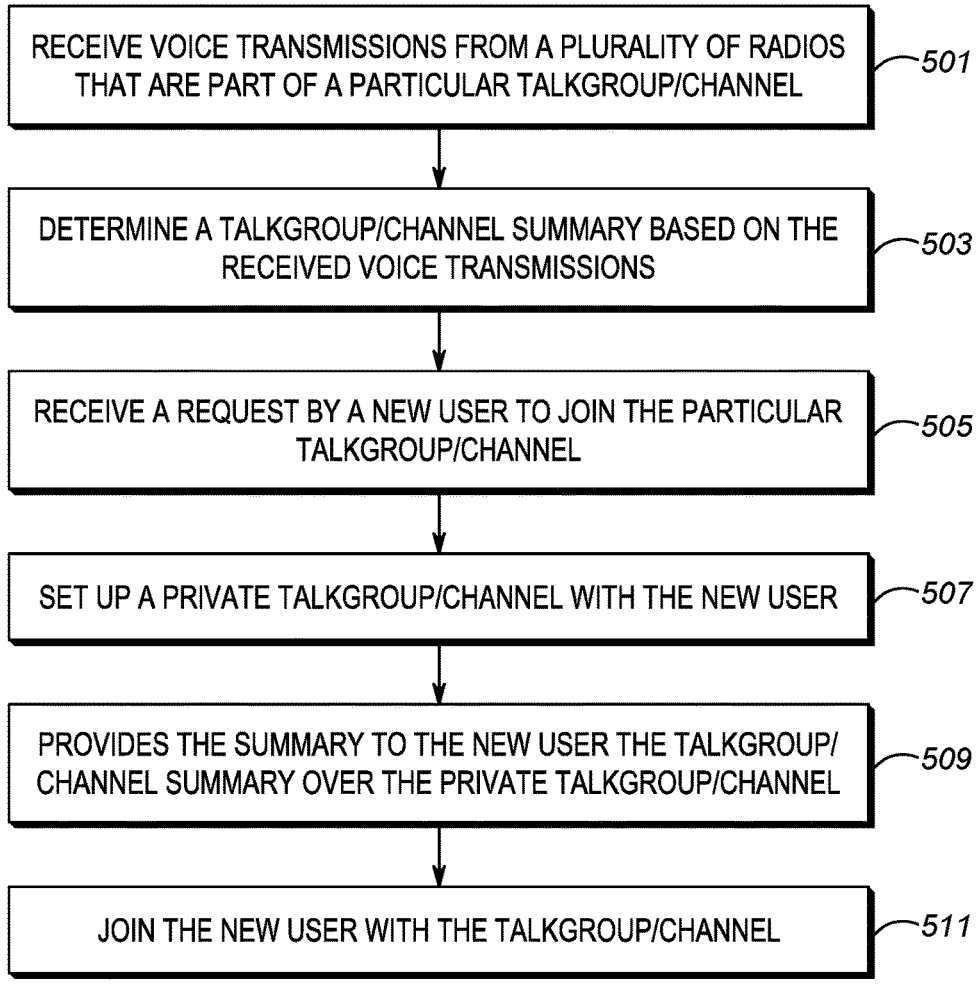
FIG. 5 is a flow chart showing operation of the device of FIG. 4.

FIG. 5 is a flow chart showing operation of the device of FIG. 4. As indicated above, the device of FIG. 4 may comprise a computer-aided dispatch center. The logic flow of FIG. 5 shows those steps (not all necessary) for providing a user a talkgroup/channel summary. The logic flow begins at step 501 where WAN transceiver 401 receives voice transmissions from a plurality of radios that are part of a particular talkgroup/channel. Logic circuitry 403 then determines a talkgroup/channel summary based on the received voice transmissions, wherein the talkgroup/channel summary comprises a summary of a history of users that have participated, or are participating in the talkgroup/channel (step 503). As discussed above, NLP 402 is utilized by logic circuitry 403 (logic circuitry 403 may comprise NLP 402) to provide a summary of the history of the users.

At step 505 WAN transceiver 401 receives a request by a new user to join the particular talkgroup/channel. Logic circuitry 403 instructs WAN transceiver 401 to set up a private talkgroup/channel with the new user (step 507), then logic circuitry 403 accesses database 264 and retrieves the summary and provides the summary to the new user the talkgroup/channel summary over the private talkgroup/channel (step 509). Finally, logic circuitry 403 instructs WAN transceiver 401 to join the new user with the talkgroup/channel (step 511).

As discussed above, WAN transceiver/logic circuitry may receive sensor data from the plurality of radios that are part of the particular talkgroup/channel, with the step of determining the talkgroup/channel summary additionally being based on the received sensor data. The sensor data may comprise data from the group consisting of video, images, acceleration, and if a gun has been drawn.

Additionally, WAN transceiver 401/NLP 402 may receive voice transmissions from the new user and the step of providing the new user with the talkgroup/channel summary comprises providing the new user with the summary that is tailored to the user based on the received voice transmissions from the new user. For example, it may be determined that the new user knows much information about the current conversation on the new talkgroup/channel. This information may not be provided as part of the summary.

As discussed above, the talkgroup/channel summary may comprise a summary of the history over a predetermined time period. The predetermined time period may comprise a period of time since the new user left that particular talkgroup/channel.

Additionally, the talkgroup/channel summary may comprise recorded audio of voice transmissions, recorded video, and/or recorded images captured by the users that have participated, or are participating in the talkgroup/channel. The talkgroup/channel summary may comprise information taken from the group consisting of demographic information, job function, age, authority, and a discussion topic.

Finally, logic circuitry 403 may instruct WAN transceiver 401 to drop the private channel after the new user has joined the particular talkgroup/channel.

Figure 6:
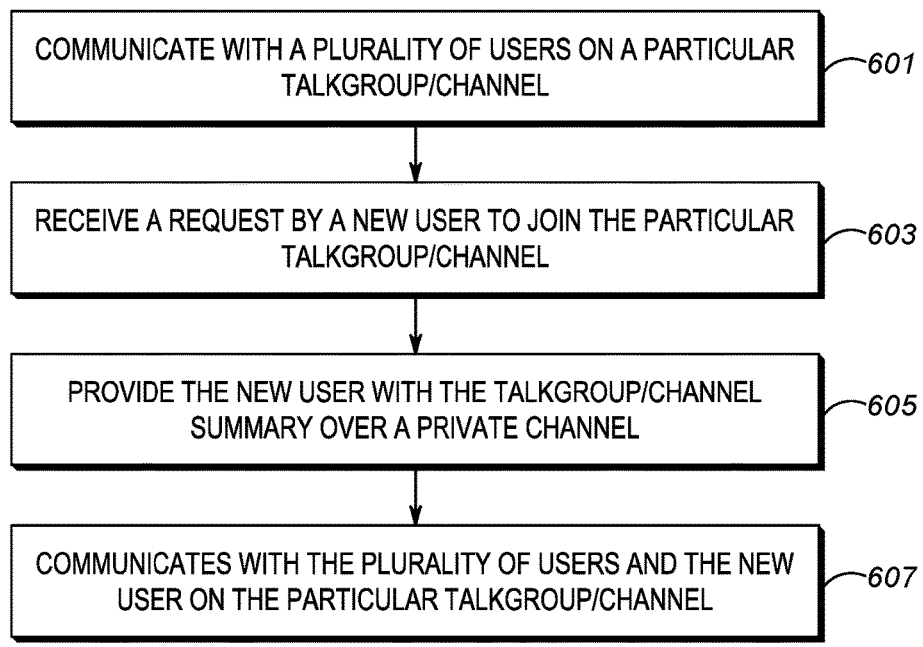
FIG. 6 is a flow chart showing operation of the device of FIG. 4.

FIG. 6 is a flow chart showing operation of the device of FIG. 4. The logic flow begins at step 601 where WAN transceiver 401 is utilized to communicate with a plurality of users on a particular talkgroup/channel. The communications are preferably communications of conversations (voice channel), however, data may be sent to the users on the particular talkgroup/channel.

At step 603 WAN transceiver 401 receives a request by the new user to join the particular talkgroup/channel and provides the new user with the talkgroup/channel summary over a private channel (step 605). Lastly, at step 607 WAN transceiver 401 communicates with the plurality of users and the new user on the particular talkgroup/channel.

As discussed above, WAN transceiver 401 is used to receive voice transmissions from the plurality of users that are part of the particular talkgroup/channel, and the talkgroup/channel summary is determined based on the voice transmissions.

Additionally, WAN transceiver 401 may receive sensor data from the plurality of users that are part of the particular talkgroup/channel, and the talkgroup/channel summary may be determined based on the sensor data.

In the foregoing specification, specific embodiments have been described. However, one of ordinary skill in the art appreciates that various modifications and changes can be made without departing from the scope of the invention as set forth in the claims below. For example, one of ordinary skill in the art will recognize that the talkgroup/channel summary may be based solely on summarized voice transmissions or solely on summarized sensor data. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a wide-area network (WAN) transceiver communicating with a plurality of users on a particular talkgroup/channel;
   the WAN transceiver receiving a request by a new user to join the particular talkgroup/channel;
   the WAN transceiver providing the new user with a talkgroup/channel summary over a private channel; and
   lastly, the WAN transceiver communicating with the plurality of users and the new user on the particular talkgroup/channel;
   a natural language processor receiving and summarizing voice transmissions from the WAN transceiver, wherein the voice transmissions are from the plurality of users that are part of the particular talkgroup/channel;
   wherein the talkgroup/channel summary is based on the summarizing;
   the WAN transceiver receives sensor data from the plurality of users that are part of the particular talkgroup/channel; and
   wherein the talkgroup/channel summary is additionally based on the sensor data.

2. A method for providing a user a talkgroup/channel summary, the method comprising the steps of:
   receiving voice transmissions from a plurality of radios that are part of a particular talkgroup/channel;
   determining a talkgroup/channel summary based on the received voice transmissions, wherein the talkgroup/channel summary comprises a summary of a history of users that have participated, or are participating in the talkgroup/channel;
   receiving a request by a new user to join the particular talkgroup/channel;
   setting up a private talkgroup/channel with the new user;
   providing the new user the talkgroup/channel summary over the private talkgroup/channel; and
   joining the new user with the talkgroup/channel;
   receiving sensor data from the plurality of radios that are part of the particular talkgroup/channel; and
   wherein the step of determining the talkgroup/channel summary is additionally based on the received sensor data.

3. The method of claim 2 wherein the sensor data comprises data from the group consisting of video, images, acceleration, and if a gun has been drawn.

4. The method of claim 2 further comprising the step of:
   receiving voice transmissions from the new user; and
   wherein the step of providing the new user with the talkgroup/channel summary comprises providing the new user with the summary that is tailored to the user based on the received voice transmissions from the new user.

5. The method of claim 2 wherein the talkgroup/channel summary comprises a summary of the history over a predetermined time period.

6. The method of claim 5 wherein the predetermined time period comprises a period of time since the new user left that particular talkgroup/channel.

7. The method of claim 2 wherein the talkgroup/channel summary comprises recorded audio of voice transmissions, recorded video, and/or recorded images captured by the users that have participated, or are participating in the talkgroup/channel.

8. The method of claim 2 wherein the talkgroup/channel summary comprises information taken from the group consisting of demographic information, job function, age, authority, and a discussion topic.

9. The method of claim 2 further comprising the step of:
   dropping the private talkgroup/channel after the new user has joined the particular talkgroup/channel.

10. A method for providing a new user with a talkgroup/channel summary, the method comprising the steps of:

utilizing a wide-area network (WAN) transceiver to communicate with a plurality of users on a particular talkgroup/channel;
receiving, by the WAN transceiver, a request by the new user to join the particular talkgroup/channel;
utilizing the WAN transceiver to provide the new user with the talkgroup/channel summary over a private channel; and
lastly, utilizing the WAN transceiver to communicate with the plurality of users and the new user on the particular talkgroup/channel;
utilizing the WAN transceiver to receive voice transmissions from the plurality of users that are part of the particular talkgroup/channel;
wherein the talkgroup/channel summary is determined based on the voice transmissions;
utilizing the WAN transceiver to receive sensor data from the plurality of users that are part of the particular talkgroup/channel; and
wherein the talkgroup/channel summary is determined based on the sensor data.

* * * * *